United States Patent [19]

Wyzgol et al.

[11] 4,392,399
[45] Jul. 12, 1983

[54] DRUM-TYPE WIRE SHEAR

[75] Inventors: Ewald Wyzgol; Hans-Jürgen Rasehorn; Gerhard Pechau, all of Magdeburg, German Democratic Rep.

[73] Assignee: VEB Schwermaschinen-Kombinat "ERNST THALMANN" Magdeburg, Magdeburg, German Democratic Rep.

[21] Appl. No.: 266,097

[22] Filed: May 21, 1981

[51] Int. Cl.³ .............................................. B23D 25/12
[52] U.S. Cl. ....................................... 83/106; 83/306; 83/322
[58] Field of Search ................................ 83/285–289, 83/306, 307, 322, 340, 342, 345, 105, 106

[56] References Cited

FOREIGN PATENT DOCUMENTS 129127 12/1977 German Democratic Rep. ... 83/307
145237 12/1980 German Democratic Rep. ... 83/307

Primary Examiner—James M. Meister
Attorney, Agent, or Firm—Karl F. Ross; Herbert Dubno

[57] ABSTRACT

An apparatus for cutting through a continuously longitudinally moving wire has a pair of cutter drums centered on and rotatable about respective generally parallel axes and having respective radially outwardly open generally helical wire grooves of substantially the same pitch but opposite hand. These drums are radially relatively closely spaced and define a nip. A guide element is integral with and fixed rotationally on one of the drums and is formed with a helical guide groove of the same hand and pitch and centered on the same axis as the respective wire groove but is axially offset therefrom. A cutter blade is provided in at least one of the wire grooves adjacent one axial end thereof. The two drums are synchronously rotated at the same peripheral speed by a drive. A swingable guide tube is directed generally tangentially at the nip and has a downstream end closely juxtaposed with the drums at the nip. The wire passes longitudinally through this tube toward the drums. An entrainment element or follower is fixed at an axial spacing on the downstream end of the guide tube and can be swung into engagement with the guide groove so that when thus engaged the downstream end of the tube is displaced at a rate determined solely by the rotation rate of the drums for perfect guiding of the wire in the mating drum grooves.

10 Claims, 5 Drawing Figures

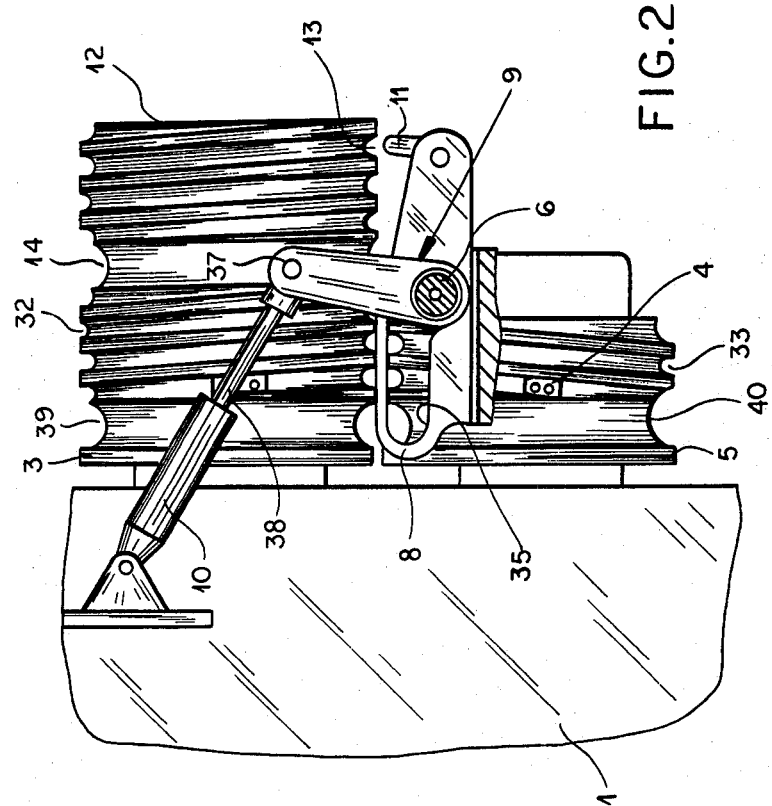

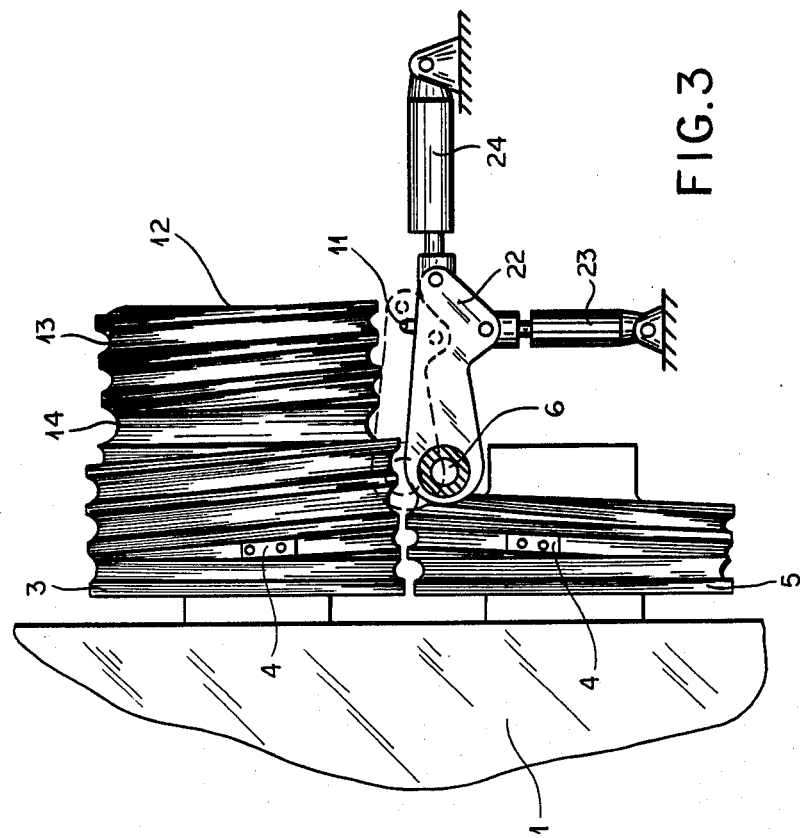

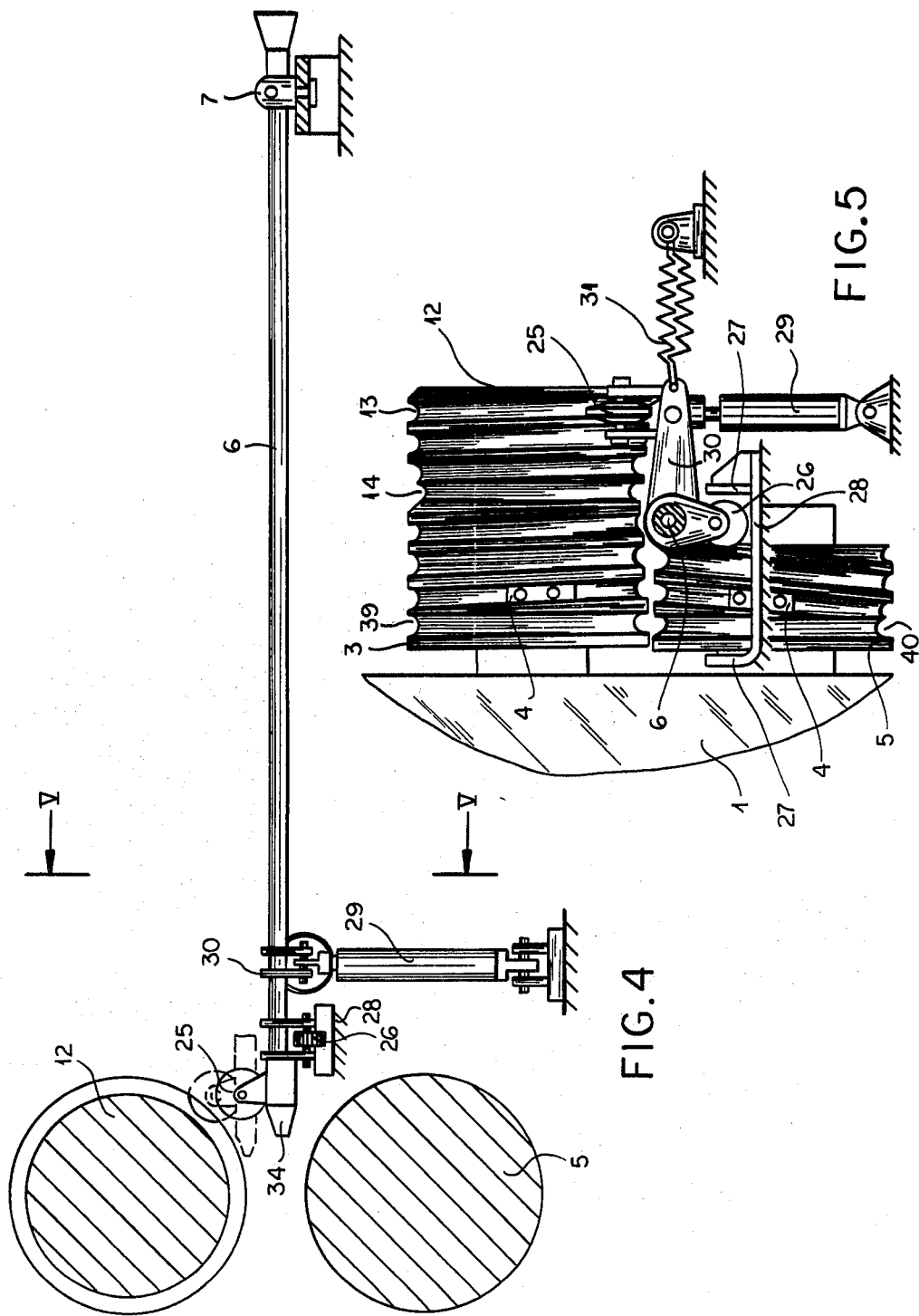

DRUM-TYPE WIRE SHEAR

FIELD OF THE INVENTION

The present invention relates to a drum-type wire shear. More particularly this invention concerns such a shear used in a wire mill to cut a wire while it is moving at high speed.

BACKGROUND OF THE INVENTION

It is necessary in a wire-drawing plant or mill to crop off the leading and trailing ends of a wire being produced, and also to cut the extremely long wire produced in one run into individual descrete sections. This operation is normally done by a so-called drum-type or running shear capable of severing the wire transversely even while moving at standard production speed, which often is in the neighborhood of 50 m/sec.

This type of shear has a pair of cantilevered drums rotatable about parallel superposed horizontal axes and each formed with a helical groove. At least one of these grooves is provided with a blade. The wire is normally advanced past these drums at a slight axial spacing from their outer ends. In order to cut the wire it is deflected axially into the mating grooves of the drums so that, as the drums rotate, the wire is drawn axially inwardly to the blade and is cut through when it reaches the blade.

The deflector, as described in East German Pat. No. 215,596, is formed by a tube through which the wire passes. The upstream end of this tube is mounted via a universal joint or swivel and the downstream end is directed tangentially at the nip defined between the two drums. This downstream end is moved by appropriate mechanism to direct the wire into the mating grooves of the drums at the desired time so as to cut the wire.

The main difficulty with these arrangements, which difficulty is particularly troublesome with relatively fine wire of a diameter of less than 5.5 mm, is almost always related to feed problems at the downstream end of the guide tube and at the cutter drums. Any misfeed can result in the wire being pinched and broken. Such a break can only be cleared with the entire string shut down, so that any such misfeed is quite expensive, both regarding the lost wire and the lost production time.

OBJECTS OF THE INVENTION

It is therefore an object of the present invention to provide an improved drum-type shear.

Another object is the provision of such a shear wherein the above-described feed problems are eliminated.

SUMMARY OF THE INVENTION

These objects are attained according to the instant invention in a shear of the above-described general type, but wherein one of the drums is provided with a guide element fixed rotationally on the one drum and formed with a helical guide groove of the same hand and pitch and centered on the same axis as the respective wire groove but axially offset therefrom. An entrainment element or follower is fixed to and spaced from the downstream end of the guide tube and is displaceable between an entrainment position engaging in the guide groove and unengaged position out of the guide groove. Means is provided for displacing the entrainment element into the engaged entrainment position and for simultaneously urging the guide tube attached thereto axially inwardly, that is toward the blade, along the nip defined between the cutter drums.

According to another feature of this invention the downstream end is provided with a transversely projecting arm carrying the follower. The displacement means includes an actuator for pivoting the arm on the tube and thereby displacing the follower. This follower may be a simple finger engageable in the guide groove, or a roller. The actuator is normally a fluid-operated cylinder, either hydraulic or pneumatic.

The upper drum according to the instant invention is formed between the guide groove and the respective wire groove with a respective endless groove into which the guide groove opens axially inwardly. Thus when the follower has moved all the way to the inner end of the guide groove it will ride around in the endless groove, staying in one place while the drums continue to rotate.

According to another feature of this invention a guide is provided at the downstream tube end for defining therefor a generally axially travel path. The downstream end can simply be engaged in a slot constituting the guide, or can ride via a roller or wheel on the guide, which has on its axial inner end a stop.

Means is provided according to this invention for urging the downstream end of the tube axially away from the blade. This means may be constituted according to the instant invention by a simple spring, or by another fluid cylinder. When such fluid cylinders are used as in the instant invention only for exerting a biasing force, rather than for positive displacement, it has been found advantageous to use pneumatic ones.

Downstream of the nip between the drums according to the instant invention there is provided structure defining a pair of passages extending in the direction of travel of the wire, which is perpendicular to the plane defined by the parallel drum axes, with the passages having upstream ends spaced apart parallel to these axes. A deflector is provided between these passages and is displaceable between a position blocking the inner passage, that is the passage from the guide element, and a position leaving this passage clear. A spring urges the deflector into the latter position. Thus this deflector, as described in greater detail below, will automatically separate cropped-off ends from the rest of a given piece of wire.

DESCRIPTION OF THE DRAWING

FIG. 2 is a section taken along line II—II of FIG. 1;

FIG. 3 is a view similar to that of FIG. 2 of another embodiment of the apparatus according to the instant invention;

FIG. 4 is a cross section through yet another apparatus according to the present invention; and FIG. 5 is a section taken along line V—V of FIG. 4.

SPECIFIC DESCRIPTION

Figure 1:
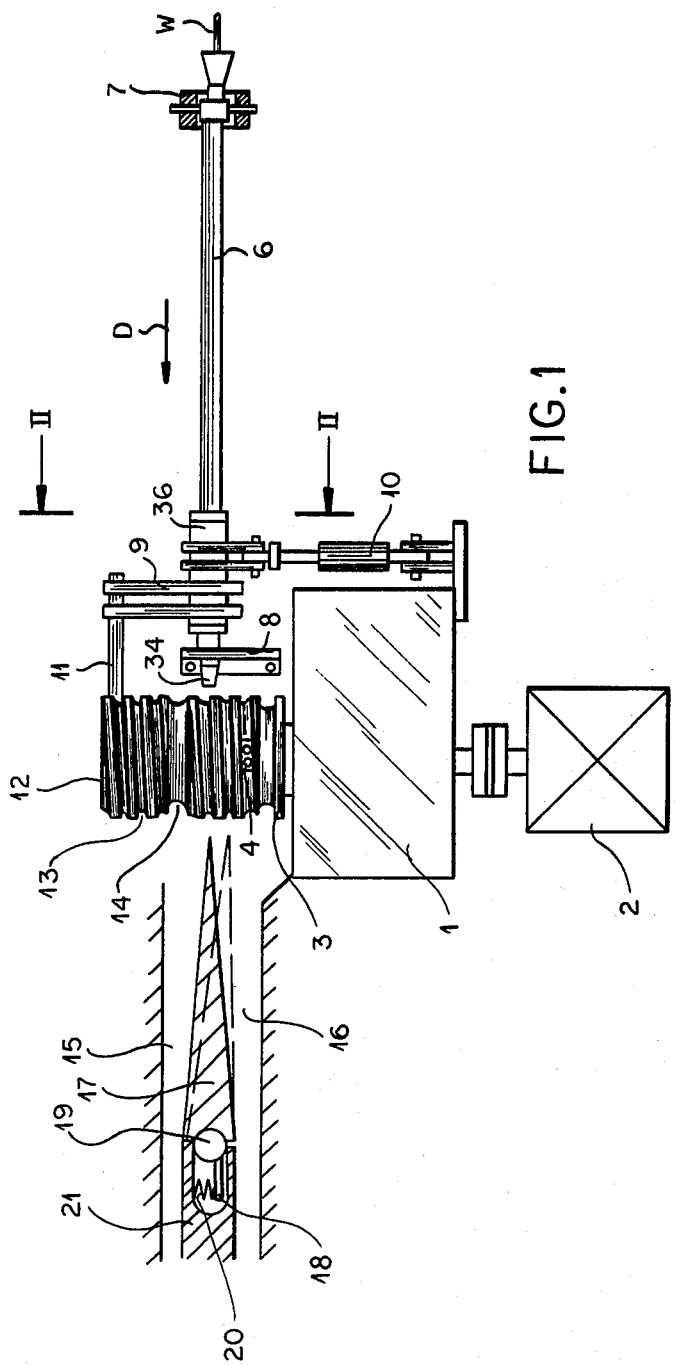
FIG. 1 is a top schematic view of the apparatus according to the present invention.

As seen in FIGS. 1 and 2 the shear according to the instant invention has a main housing 1 containing a heavy-duty constant-mesh gear transmission and carrying upper and lower cutter drums 3 and 5 rotatable about and centered on respective parallel axes. A drive motor 2 carried on the housing 2 rotates these drums 3 and 5 oppositely at the same peripheral speed about their respective axes. The drums 3 and 5 are formed with respective helical grooves 32 and 33 of the same pitch and semicircular section but of opposite hand. In addition the drums 3 and 5 are provided in the respective grooves at the inner ends thereof with shear blades 4 extending generally radially of the respective axes. The upper drum 3 is formed unitarily with a guide element 12 itself formed with a helical groove 13 of the same pitch and hand and centered on the same axis 3A as the groove 32. Between the two helical grooves 13 and 32 the upper drum 3 is formed with a nonhelical endless groove 14 into which the guide groove 13 opens axially inwardly. Both of the cantilevered drums 3 and 5 are also formed axially inside their respective grooves 32 and 33 with such endless circumferential grooves 39 and 40 into which the respective wire grooves 32 and 33 open.

A guide tube 6 for a small-diameter wire W has an upstream end secured in a universal joint 7 and a downstream end 34 that therefore can move transversely to a wire transport direction D but not in this direction. This downstream end 34 is confined in a guide groove 35 of a guide 8 for motion only generally parallel to the axes of the drums 3 and 5. More specifically, the guide groove 35 has an outer low portion remote from the housing 1 and an inner raised portion close to the housing 1, so that as the downstream end 34 of the tube 6 moves axially inwardly toward the housing 1 in the groove it will be lifted somewhat at a location generally aligned with the outer ends of the two grooves 32 and 33.

A collar 36 that can rotate on the tube 6 immediately upstream of its downstream end 34 but which is longitudinally nondisplaceable on the tube 6, that is which cannot move upstream or downstream in the displacement direction D of the wire W on the tube 6, carries a pair of transversely projecting arms 37 on which is pivoted the piston rod 38 of a hydraulic cylinder 10 whose cylinder is pivoted on the housing 1. Another pair of transversely projecting arms 9 fixed on the collar 36 carries a follower or entrainment element 11 which is engageable in the guide groove 13. Thus if the cylinder 10 contracts it will pivot the arms 9 and entrainment element 11 on the tube 6 and engage the element 11 in the guide groove 13.

On the downstream side of the drums 3 and 5 there is provided a pair of passages 15 and 16 separated by a deflecting flap 17 mounted on an upright pivot 19 extending parallel to the plane of the parallel axes of the drums 3 and 5. This flap 17 is provided with a lever 18 extending downstream in the direction D and a spring 20 is braced between it and an abutment 21 formed in the partition between the two passages 15 and 16.

The system described above functions as follows:

When for instance, the leading end of a wire W is to be cropped, a signal is delivered to a valve controlling the ram 10 by an appropriate controller which, as described in the jointly filed and copending application Ser. No. 265,819, is connected to an appropriate sensor switch at the upstream end of the tube 6. The front compartment of the cylinder 10 is pressurized to contract the cylinder 10 and rotate the sleeve 36 on the tube 6 counterclockwise as seen in FIG. 2. This action pushes the entrainment element or follower 11 up into the groove 13 of the rotating guide element 12 and urges the downstream end 34 of the tube 6 axially to the left, toward the inner axial ends of the grooves 32 and 33 where the blades 4 are.

Once the wire arrives at the blades 4 it is cut transversely through, in this case the leading end is cropped off. The deflector 17 will push the cropped-off end into the right-hand passage 15 and the remainder will be deflected into the left-hand passage 16. More specifically the leading end of the wire W will have started out to the right, seen looking horizontally in the transport direction D, of the deflector 17 so that even though the wire will have moved to the right, the deflector 17 will simply have been pushed to the side against the force of its spring 20 into the dashed-line position of FIG. 1. When, however, the wire W is cut, the deflector will snap back to its solid-line position and the portion following the cut will go into the other passage. In this manner the recyclable ends can be easily separated from the good central portion of the wire.

Once the wire W is cut through the cylinder 10 is depressurized or even pressurized to extend so as to move the tube 6 back to the starting position.

The arrangement of FIG. 3 is similar to that of FIGS. 1 and 2, with like structure having like reference numerals, but in this arrangement the lever arrangement 9 and guide 8 are not used. Instead a plate 22 mounted on the tube 6 or on a sleeve 36 on the tube 6 is connected to a vertically effective hydraulic or pneumatic ram 23 and to a horizontally effective ram 24. The follower or entrainment element 11 is provided directly on the plate 22.

With this system the cylinder 23 is pressurized and extended to engage the follower 11 in the groove 13, and the cylinder 24 is pressurized to urge the tube end 34 axially inwardly before cutting and axially outwardly after cutting.

In the arrangement of FIGS. 4 and 5 a roller-type follower 25 is fixed on the outer end of an arm 30 carried in turn on the leading end 34 of the tube 6. In addition this leading end rides via a wheel 26 on a guide track 28 having a stop 27 at its inner end, at a position corresponding to alignment of the tube 6 with the inner endless grooves 39 and 40. Another double-acting cylinder 29 is engaged between a fixed point and this arm 30, and is expansible to lift the roller/follower 25 and engage it in the guide groove 13. Tension springs 31 are hooked between the outer end of this arm 30 an another fixed abutment.

With this system the single cylinder 29 is pressurized in response to a signal as described above to engaged the roller/follower 25 in the groove 13. Thereafter the rotation of the guide body 13 with the drums 3 and 5 will draw the tube end 34 axially inwardly, with this end 34 meanwhile being supported by the wheel or roller 26 on the track 28. The wire will be cut immediately before the roller 25 arrives in the endless groove 14. Thereafter the cylinder 29 is relaxed to disengage the roller 25 from the guide groove 13, and the return springs 31 pull the downstream end 34 back to the solid-line starting position.

Thus with the system according to the present invention absolute synchronization of the wire and guide tube is ensured by mechanically linking the cutter drums via the guide groove 13 to the downstream end 34 of the guide tube 6. There is no possibility of misalignment, so that costly down time resulting from wire breakage caused by such misalignment is avoided.

We claim:

1. An apparatus for cutting through a continuously longitudinally moving wire, said apparatus comprising:
   a pair of cutter drums centered on and rotatable about respective generally parallel axes and having respective radially outwardly open generally helical wire grooves of substantially the same pitch but opposite hand, said drums being radially relatively closely spaced and defining a nip;

a guide element fixed rotationally on one of said drums and formed with a helical guide groove of the same hand and pitch and centered on the same axis as the respective wire groove but axially offset therefrom;

a cutter blade in at least one of said wire grooves adjacent one axial end thereof;

drive means for jointly and synchronously rotating said drums at substantially the same peripheral speed;

a swingable guide tube directed generally tangentially at said nip and having a downstream end closely juxtaposed with said drums at said nip, said wire passing through said tube;

a follower fixed to and at a fixed axial spacing from said downstream end and displaceable between an entrainment position engaging in said guide groove and an unengaged position out of said guide groove; and means for displacing said follower into said entrainment position and simultaneously urging said guide tube attached thereto axially along said nip.

2. The shear defined in claim 1 wherein said downstream end is provided with a transversely projecting arm carrying said follower, said means for displacing including an actuator for pivoting said arm on said tube and thereby displacing said follower.

3. The shear defined in claim 2 wherein said follower is a roller carried on said arm and engageable in said guide groove.

4. The shear defined in claim 2 wherein said actuator is a fluid-operated cylinder.

5. The shear defined in claim 1 wherein said upper drum is integral with said guide element and is formed between said guide groove and the respective wire groove with a respective endless groove which said guide grooves opens axially inwardly into.

6. The shear defined in claim 1, further comprising means including a guide for said downstream end for defining a generally axial travel path therefor.

7. The shear defined in claim 6 wherein said downstream end is provided with a wheel supporting said downstream end on said groove.

8. the shear defined in claim 1, further comprising means for urging said downstream end axially away from said blade.

9. The shear defined in claim 1, further comprising structure forming a pair of passages aligned with said nip downstream of same, and a deflector between said passages directed tangentially at said nip and displaceable between a position blocking one of said passages and a position blocking neither of said passages.

10. The shear defined in claim 1 wherein said tube has an upstream end provided with a swivel mount.

* * * * *